(12) United States Patent
Meyers

(10) Patent No.: US 6,839,080 B2
(45) Date of Patent: Jan. 4, 2005

(54) REMOTE SERVER SWITCHING OF VIDEO STREAMS

(75) Inventor: Stephan Meyers, Tampere (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 10/036,094

(22) Filed: Dec. 31, 2001

(65) Prior Publication Data

US 2003/0122924 A1 Jul. 3, 2003

(51) Int. Cl.7 .............................................. H04N 7/14
(52) U.S. Cl. ................................ 348/14.11; 348/14.02; 348/584
(58) Field of Search ........................... 348/14.01–14.09, 348/14.1, 14.11, 14.12, 14.13, 376, 584, 732; 345/723, 753; H04N 7/14

(56) References Cited

U.S. PATENT DOCUMENTS 5,579,239 A    11/1996  Freeman et al.
5,684,716 A *  11/1997  Freeman .................. 348/14.01
6,246,430 B1 *  6/2001  Peters et al. ............. 348/14.01

FOREIGN PATENT DOCUMENTS

JP    410234022   *  9/1998  ............ H04N/7/14
JP    411266271 A *  9/1999  ............ H04L/12/28

OTHER PUBLICATIONS

Trinca; Process for carrying . . . with television modalities; Dec. 9, 1999; WO 99/63756.*
Printout from Play Streaming Media Group website regarding "GlobeCaster" (3 pages).

* cited by examiner

Primary Examiner—Melur Ramakrishnaiah
(74) Attorney, Agent, or Firm—Ware, Fressola, Van Der Sluys & Adolphson LLP (57) ABSTRACT

A portable video switching device receives video streams from a multiple number of different video capture devices located remotely and selects one of the video streams for further transmission. The portable video switching device receives video streams via wired, wireless or mobile telecommunication network connection and has video production capability to manipulate the selected video stream to add special effects, fading and the like.

30 Claims, 3 Drawing Sheets

REMOTE SERVER SWITCHING OF VIDEO STREAMS

BACKGROUND OF THE INVENTION

Technical Field

The present invention relates generally to video stream switching and deals more particularly with a portable video switch for receiving one or more video streams from remote locations for broadcast to another location.

The popularity and growth of the global computer network, commonly referred to as the Internet, has accelerated and greatly expanded the demand for the exchange, type and volume of information between a provider and a viewer. The increased availability of such expanded information in a timely manner has come to influence, impact and change our culture. However, the distribution of video captured events is not always purely objective and may reflect the particular views of the media organization or agency and therefore the tone and bias of the information provided to the general public.

The advent and increasing wider-spread use and availability of personal videophones will continue to influence cultural change in a less obvious but equally important manner as the Internet by forcing greater objectivity and democratization of conventional television news broadcast content. The readily apparent move to increased objectivity of event coverage can be traced to the widespread availability of personal video recording devices because these video devices insure that such events will be recorded and made available to nearly everyone regardless of the conventional media coverage. One example of such an event and the corresponding cultural effect is evidenced by the well known and widely viewed Rodney King incident captured on videotape and which video was broadcast substantially without editing or change.

Currently, individuals or relatively small organizations exist that provide regular or irregular channels of audio and video entertainment, although due to cumbersome encoding and transmission requirements the video productions tend not to be in real time. In addition, the maximum audience size tends to be relatively small due to the cost of bandwidth required to reach larger audiences. Systems for nonlinear video editing for the home, generally using digital video cameras with "FireWire" connections are available. Other known systems, notably Play's GlobeCaster "Internet television station" are suited for a home studio production. However, none of these systems can accommodate and accomplish live wireless production in the field.

Personal videophones permit live, on-the-spot spontaneous coverage of events from natural disasters and crimes to local sports and entertainment. The availability of videophones tied to inexpensive Internet "broadcasting" permits not only the recording and playback but also the distribution of video information in real time to an audience of any size. While large media organizations and agencies will still have the edge in terms of reliability and widespread exposure, other voices and viewpoints will have the opportunity to be heard and seen.

It would be desirable, therefore, to provide a portable video switch for receiving video streams from a number of video capture devices as the basis for a video production studio for personal broadcasting, for example on the Internet.

SUMMARY OF THE INVENTION

In its broader aspects, the remote server switching of video streams of the invention are embodied in a portable video switch means located remotely from the source of video streams. The portable video switch has input means for receiving at least one video stream and means for selecting one of the video streams for further transmission.

Preferably, the source of the remote video stream is a video capture device such as a videophone.

Preferably, the portable video switch means is coupled to a network for receiving at least one video stream from at least one video source connected to the network.

Preferably, the network has a dedicated server having an output coupled to a further transmission means for transmitting a selected video stream.

Preferably, the network is a LAN, wireless LAN or cellular telecommunications network.

Preferably, the portable video switch receives video streams of the other remote video sources and has means to selectively indicate any one of the video streams for further transmission by the dedicated network server.

Preferably, the dedicated network server is coupled to a video switch for adding special effects to a selected video stream for further transmission.

In a further aspect of the invention a method for remote switching of video streams provides at least two video streams to a network server and uses a portable video switch for viewing the information content of the video streams and selecting at the network server a desired one of the at least two video streams based on the information content. The selected video stream is transmitted for viewing at a location remote from the network server.

Preferably, the method includes providing instructions to the network server via the portable video switch to modify the selected video stream with desired video effects for further transmission.

Preferably, the method includes providing a dedicated network server.

Preferably, the method includes providing a wireless LAN network.

Preferably, the method includes providing a portable video switch with mobile telecommunication capability.

Preferably, the method further includes providing video streams from a video capture device.

Preferably, the method includes providing video streams from a video telephone.

Preferably, the method includes providing a portable video switch with video processor capability wherein the portable video switch also functions as the network server.

Preferably, the method includes transmitting the selected video stream to the global computer network.

Preferably, the method includes transmitting the selected video stream to a remote video telephone that has established a communication link with the portable video switch.

Preferably, the method includes providing a portable video switch with video signal enhancing capability.

These and other objects, features and advantages of the present invention will become more apparent from an understanding of the following detailed description of the preferred embodiments of the invention when considered in conjunction with the accompanying drawings.

DETAILED DESCRIPTION

A conventional video switch is used in television production to manage and transition between multiple streams of video content to produce a finished work. In traditional video production (i.e., not computers), the video switch has a number of physically different input video sources (generally at least two) because as soon as there is more than one source of video, switching is required. The operator selects, generally via the use of push buttons, which one of these several video sources to send to the output. Further, the video switch can apply various effects, such as transition effects, to each of the video inputs. For example, the operator can typically fade from one video signal to another, either with manual control or at a preset speed. Other effects typically include wipes and "keying" or the replacement of visual information in one signal with the information in another signal based on the luminance or chrominance values in a third signal (which third signal can be the same as one of the other two). The term "keying" is commonly referred to as "bluescreen". Modern video switches have many other technically advanced capabilities, such as geometric transformations of the video inputs, morphing, etc., and such video switches and their operation have increased complexities.

A video switch operator typically sits at a control panel (usually called a "production suite") with many video screens or monitors. These screens typically include, at a minimum, one screen for each possible video source, and another screen, which shows the output. For example, if there are three live cameras and two videotape sources, there will typically be at least six video screens present, five to display the input source videos, and one to display the output video. The operator decides which of the input video sources is desired for the output by viewing the different screens. However, it would not be exceedingly difficult to put all of these input source videos onto one screen as a series of thumbnail size sub-windows, also referred to as picture-in-picture. In practice, however, there may not be a sufficient number of video screens or monitors and a "channel A/B" type switch is used to select between input source videos.

Now considering the following hypothetical example for purposes of a better understanding of the remote server switching of video streams of the invention. An individual may desire to produce a video at a remote site using a portable video switch. Additionally, consider that there are several other users with, for example, video cameras with wireless connections, and the users can wander around an area transmitting live images back to a video server that produces an output video stream. The user of the portable video switch might be able to view, for example, thumbnail size windows of the input video images sent back to the video server as well as a window of the current video output from the video server. The user of the portable video switch could then control and "produce" the live video output for transmission by sending instructions to the video server. However, the above hypothetical remote site production requires a large amount of bandwidth and resources for implementation. If, for example, N cameras send their respective video signals directly by a local wireless connection to the video switch, the video switch must have enough computational power to process these N cameras' video signals, manipulate their signals, and re-encode the output video signal. Additionally, the cameras are limited by the operational distance of the wireless connection.

Let us assume, then, that the N cameras use a less local method of connection, such as a cellular phone type connection model and that each camera places a conventional call to the portable video switch. In this scenario, the N cameras can be located anywhere in the world, but the video switch must still be able to handle the N incoming video streams, and if the N cameras are in the same network cell as the portable video switch, the N streams have to be sent out to the network, and then back to the portable video switch, thereby consuming twice as much bandwidth. The portable video switch then has to use an additional full video bandwidth connection to send the completed video stream to the end viewers.

Now turning to the drawings and considering the invention in further detail, the basis of the portable video switch of the invention resides in a central server that cooperates with a conventional video switch to produce a desired video stream for further broadcast. Each camera sends its video stream and other associated inputs, for example, audio to the central server. The central server then encodes two output streams: the first stream, or "preview stream," is composed of thumbnail size images of the input video streams, and a preview of the output video. The second video stream is composed from the first based on feedback from the user, and represents the finished video product for transmission to viewers who wish to watch it.

The portable video switch that the user uses remotely is simplified compared to a conventional video switch and needs only have the capability to accept and display a single video stream and send commands to the central server. The central server is required to have enough processing power, memory and storage capacity to handle the N input video streams, plus other possible sources of video, as well as encoding the video output, etc. However, since the central server is more likely than not to be located in a network environment it can, in principle, have as much processing power as required without being limited by size, power supply constraints, etc.

The portable video switch of the present invention provides additional advantages, such as, for example, if the connection to the central server is degraded, but the individual video capture devices or other video sources are not, there is no loss of quality in the output video stream. The user of the portable video switch may experience a degraded view of the preview, but the degraded preview does not affect the viewers of the final video product, which is output from the central server. Since the controlling device need only have the ability to display a single encoded stream, or perhaps several low quality streams, the controlling system can be scaled across a wide variety of hardware platforms; in other words, the present invention contemplates that a professional, broadcast-quality show may be controlled from a smart phone. Further, it is possible to develop algorithms for video transitions, such as wipes and fades that avoid successive lossy re-encoding of an encoded stream, thus enhancing final quality. Finally, other video sources, such as pre-recorded video streams, tapes, real time rendered animation, text, etc., can be produced at other locations in the network with no practical limit on quality, rather than being produced on the user system.

Figure 1:
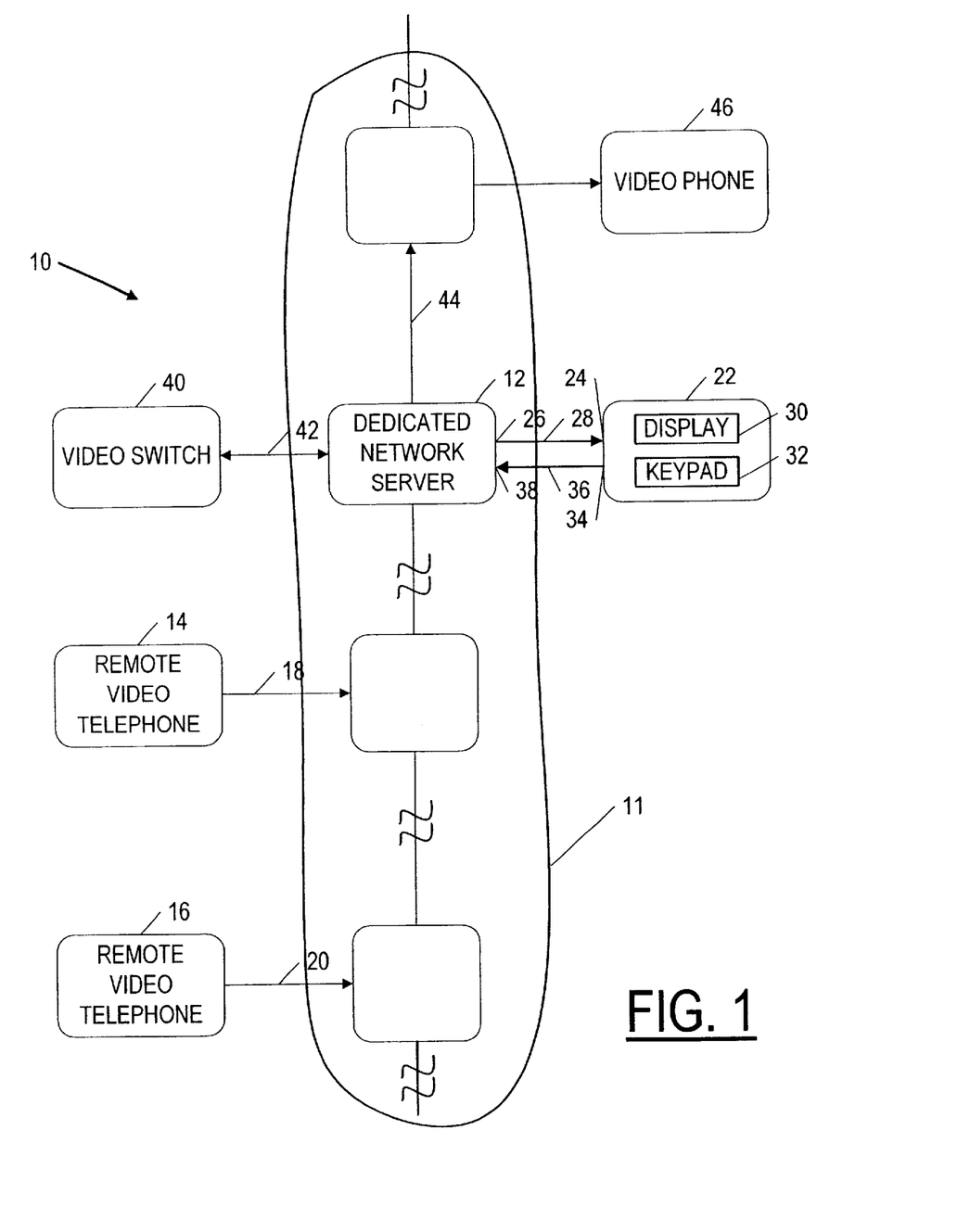
FIG. 1 is a schematic functional block diagram illustrating apparatus embodying the present invention for remote server switching of video streams.

Referring to FIG. 1, a remote video server system according to a first embodiment of the present invention is illustrated in functional block diagram form and is generally designated 10. The system 10 includes a dedicated network server 12 which may be located in a fixed part of the network, generally designated 11. One or more remote videophones 14, 16 establish and connect with the network 11 and the dedicated network server 12 in a normal manner. Each of the remote videophones 14, 16 transmit their respective video output stream shown generally as 18, 20 to the network 11 and the dedicated network server 12. The video output streams 18, 20 which may be in a standard MPEG format or other suitable video standard are transmitted to and received by the dedicated network server 12 in a normal manner and may be "live" or in real time as the images are captured by the remote videophone. The portable video switch shown generally as 22 has an input 24 coupled to a video stream output 26 of the dedicated network server 12 to receive the at least one of the video output streams 18, 20 via a video connection path 28. The video stream content is viewable by the "producer" on a display 30 at the portable video switch 22. The "producer" provides instructions and directions to an operator at the dedicated network server 12 by means of a keypad 32, voice communication or other signaling means at the output 34 via the lead 34 connected to the input 38 at the dedicated network server 12. The "producer" indicates which of the multiple video streams should be selected for further transmission by the dedicated network server 12 and whether the selected video stream should be manipulated to add special effects, fading, and so forth prior to further transmission. A video switch 40 located at and connected to the dedicated network server 12 via a video connection path 42, uses the computational power of the processor in the dedicated network server to create the desired video effects. The selected video stream shown as 44 can be sent for viewing to other remote videophones 46 connected to the network. The video stream 44 can also be input to a traditional broadcast system, cable system or other video distribution system for "live" viewing. The video stream 44 can likewise be archived or stored for subsequent retrieval and distribution or viewing.

Figure 2:
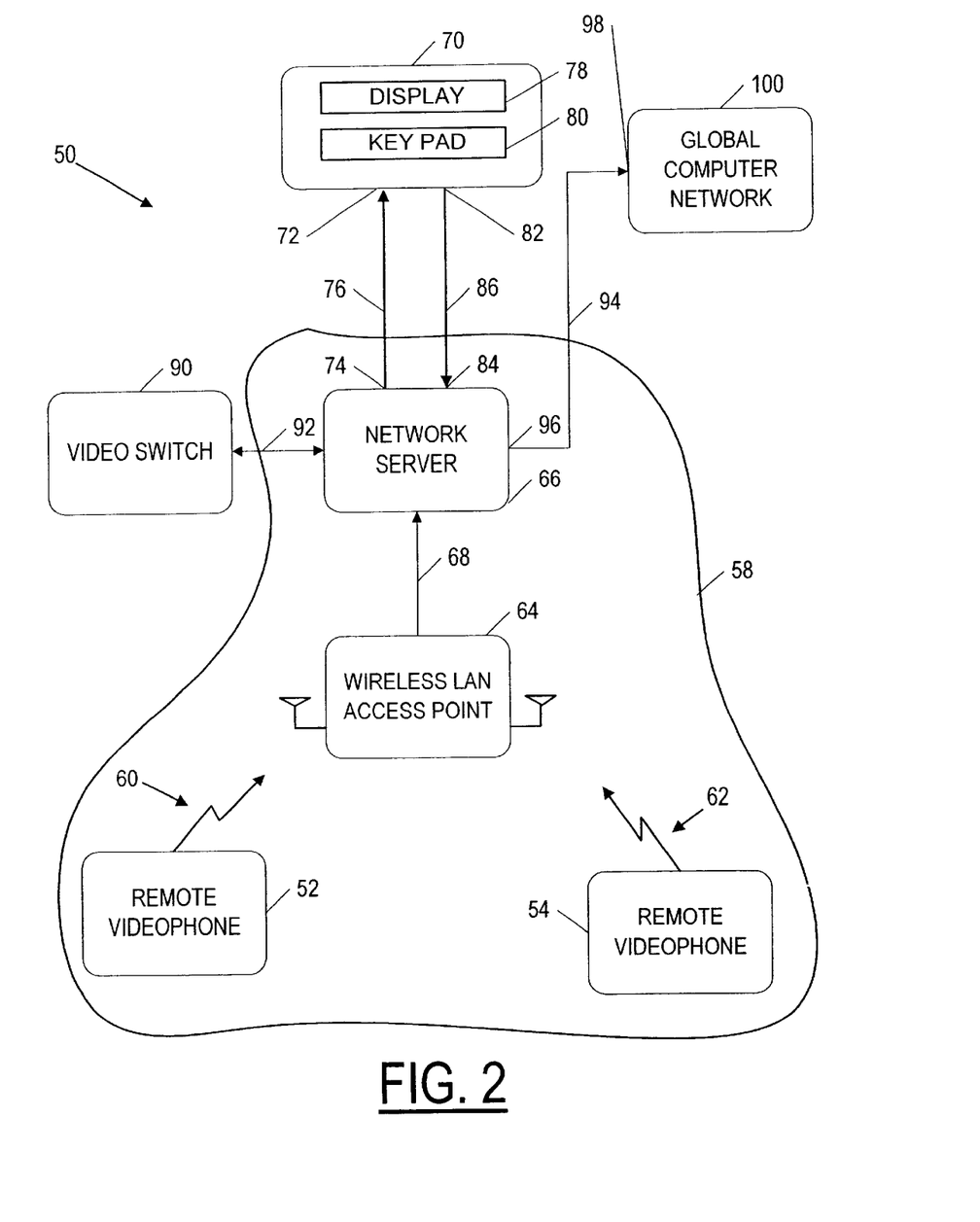
FIG. 2 is a schematic functional block diagram illustrating apparatus having an alternate embodiment of the present invention for remote server switching of video streams.

Referring now to FIG. 2, a remote video server system according to an alternate preferred embodiment of the present invention is illustrated in functional block diagram form and is generally designated 50. The system 50 includes a wireless local area network (LAN) generally designated 58. A number of remote video capture devices or videophones 52, 54 are enabled and configured for wireless LAN operation. Each of the remote videophones 52, 54 transmits its respective video output stream shown generally as 60, 62 to a wireless LAN access point generally designated 64. The wireless LAN access point is coupled to a network server generally designated 66 via the network connection lead 68. The video output streams 60, 62 are transmitted to and received by the wireless LAN access point 64 in a normal manner and may be "live" or in real time as the images are captured by the remote videophone. A portable video switch shown generally as 70 has an input 72 coupled to a video stream output 74 of the network server 66 to receive the at least one of the video output streams 60, 62 via a video connection path 76. In a similar manner as described in connection with FIG. 1, the video stream content is viewable by the "producer" on a display 78 at the portable video switch 70. The "producer" provides instructions and directions to an operator at the network server 66 by means of a keypad 80, voice communication or other signaling means at the output 82 via the lead 86 connected to the input 84 at the network server 66. The "producer" indicates which of the multiple video streams should be selected for further transmission by the network server 66 and whether the selected video stream should be manipulated to add special effects, fading, and so forth prior to further transmission. A video switch generally designated 90 is located at and connected to the network server 66 via a video connection path 92 and uses the computational power of the processor in the network server to create the desired video effects. The selected video stream can be reviewed again by the "producer" at the portable video switch 70 prior to the further transmission. Generally, however, the selected video stream shown as 94 is coupled from the output 96 of the network server 66 to the input 98 of a global computer network shown generally as 100 and referred to as the Internet. The selected video stream 94 is transmitted over the Internet in any well-known or future developed manner for access and viewing by an audience.

The wireless LAN configuration requires means for deciding which videophones are available to transmit video information, for example, the "producer" may expect and rely upon receipt of a video stream from one location as the content for the selected video stream for further transmission but may not receive the expected video stream for some reason. Accordingly, means well known to those skilled in the art and located as part of the wireless LAN access point 64 functions to poll the videophones to determine the presence and identity of any videophones in communication with the wireless LAN access point. The polling and identifying means provides an indication of the presence or absence of the videophone to the portable video switch 70 via the network server 66. This configuration requires the videophone to operate in a "dedicated" mode, that is, a connection is maintained with a wireless LAN access point that operates with a pre-identified portable video switch via the network server. In some applications it is contemplated that users might decide to switch their respective video capture units into a "non-dedicated" mode which would allow any portable video switch connected to a wireless LAN access point, via a network server to capture and utilize the video stream being sent by the videophone.

Figure 3:
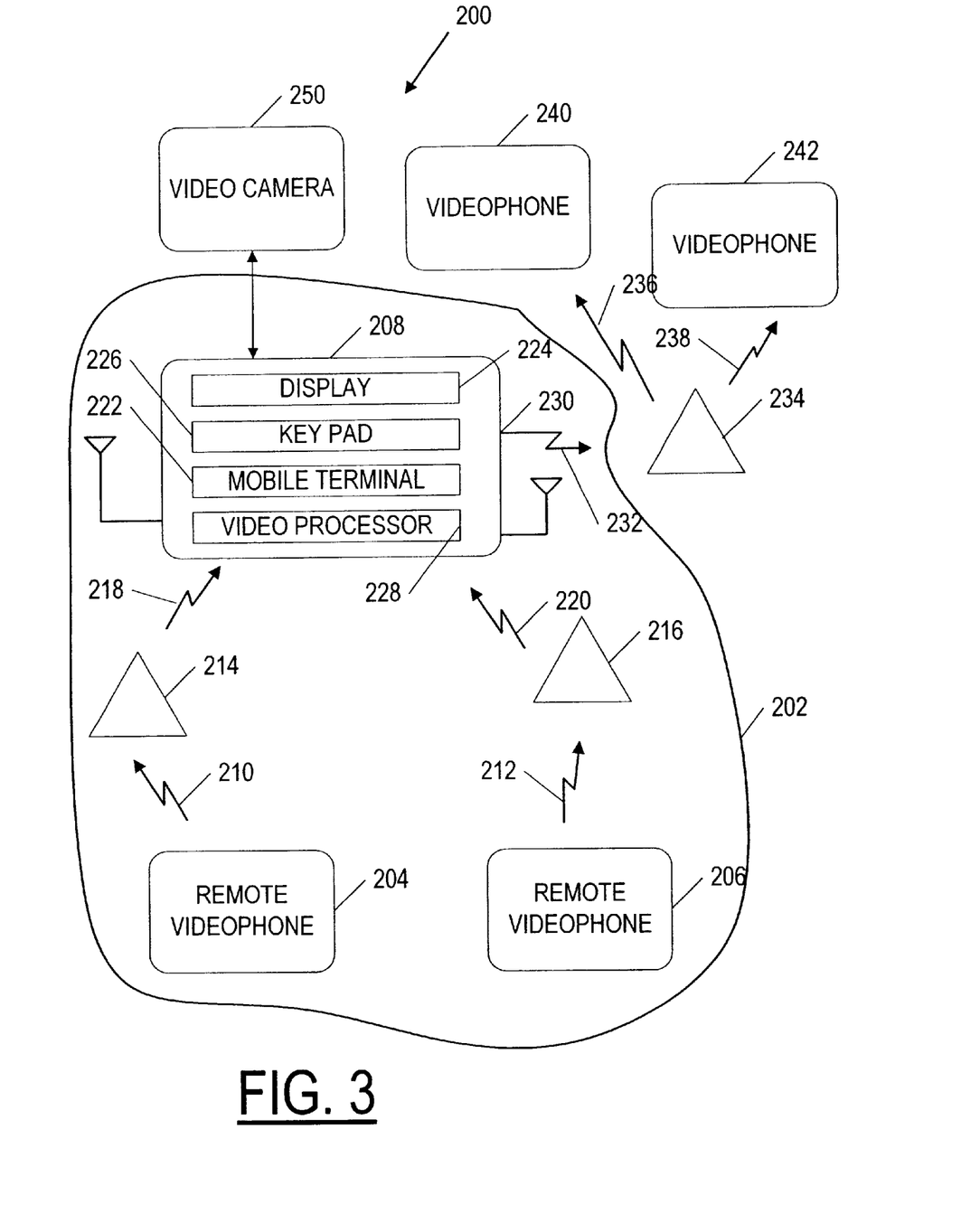
FIG. 3 is a schematic function block diagram illustrating apparatus having a yet further alternate embodiment of the present invention for remote server switching of video streams.

Referring now to FIG. 3, a remote server video system according to a further alternate embodiment of the present invention is illustrated in functional block diagram form and is generally designated 200. The system 200 includes a cellular wireless system generally designated 202. One or more remote video capture devices or videophones 204, 206 are arranged and are configured as a mobile terminal. Each of the videophones has an assigned telephone number and is uniquely identifiable from one another and from other mobile terminals and videophones. A portable video switch generally designated 208 is configured as a mobile terminal and has an assigned telephone number for access and for establishing a communications connection. Although telephone numbers are used in the disclosure as the means of unique identification, other means for identification of the terminals can be used, for example, encoding a unique identifier in a preamble during the establishment of a connection. The cellular wireless system provides greater flexibility and ease of setup compared to wired and wireless LAN systems since all devices have an assigned telephone number to establish a connection. One advantage of the cellular wireless system over a wireless LAN system is the video capture devices do not need to be co-located with the network server thus permitting the video stream sources to be located anywhere in the world. In the system 200, a remote videophone 204, 206 dials the telephone number of the portable video switch 208 to establish a cellular connection with the portable video switch 208. As shown in FIG. 3, the connection may be via a mobile telecommunication network shown generally at 214, 216. The individual video streams generally designated 210, 212 from the videophones 204, 206, respectively, are transmitted via the respective mobile telecommunication network 214, 216 to the portable video switch 208 via the communication paths represented generally as 218, 220, respectively. The portable video switch 208 includes a mobile terminal 222 for establishing the communications connection when the telephone number of the portable video switch 208 is dialed. Any videophone desiring to be added to the system simply dials the telephone number of the portable video switch 208 and sends its respective video stream upon connection. Although the videophones are preferably mobile video capture devices, the video capture devices may be of any suitable type now known or future developed and capable of transmitting a video stream to the portable video switch. For example, amateur video production devices add flexibility to pre-produce or add special video effects before transmitting the video stream to the portable video switch.

The portable video switch 208 includes a display 224 for viewing the video streams sent by the videophones and videos selected for further transmission. The individual video streams can be shown as a composite video image similar to a picture-in-picture display or as a series of thumbnail images. The "producer" selects at least one of the video streams for further transmission. The display 224 may be a touch screen for example, and the "producer" can "touch" the image of the video stream desired for further transmission. The video stream selected for further transmission may be manipulated by the "producer" by means of a keypad 226 and the video processor means 228 to add special effects, fading, and so forth prior to further transmission. In the embodiment of FIG. 3, the processing that is done by a network server cooperating with a video switch is carried out in the portable video switch 208. The video processor means 228 is similar to a conventional video switch such as the one described above in connection with FIGS. 1 and 2. In this case, the portable video switch 208 has increased processor capability to manipulate the video signals, provide composite video signals and carry out the required instructions input by the "producer" in selecting a video stream for further transmission. The video stream selected for further transmission is shown generally as 232 and is presented at the output 230 of the portable video switch 208. The video stream at output 230 selected for further transmission is sent, for example, to one or more mobile terminals or videophones generally designated 240, 242 that have established a video path connection generally designated 236, 238 respectively to the portable video switch output 230 via a mobile telecommunication network 234 to receive the selected video stream. The portable video switch 208 may also optionally include a video capture device 250 to provide a video stream input of images taken at the location of the portable video switch. These video streams are handled in a similar manner as video streams input from remote video capture devices.

In order to gain a better understanding of the invention, several typical applications of usage of the remote video server system are presented in the examples, which follow below.

EXAMPLE 1

A popular band is playing at a local entertainment club. The band has fans scattered around the world and the bandleader has asked you to produce the video for the performance. An online invitation is sent via the global computer network to the band's worldwide fan base. To assist in the video production, a number of your friends who have videophones agree to spread out and to capture video sequences of the performance. You take a seat near the audio booth and set your own camera up on a tripod with a constant view of the stage, and patch the audio from the both directly into your camera for transmission. A laptop computer functions as the portable video switch and provides all the processing power necessary to select the best wide shot of the band or close-up of the lead guitarist's solo. During the break between sets, fans in Beijing, Sao Paulo, and Topeka call, so you decide to cut to the fans for interactive audience participation and let them call out their song requests, and these video streams are directed to the video monitors in the club. During the second set, you walk around the club talking to people while still controlling the video broadcast. One fan has a particularly striking painting on their web site, so you decide to use that as the background, keyed in behind the band for their closing number. Finally, during the encore, you quickly type up a list of the camera people and correct the spelling of the name of that new drummer. At the end of the concert, the credits roll, generated professionally on the portable video server. The entire concert is archived on the portable video server as well, so fans can watch it on demand.

EXAMPLE 2

Disaster strikes! Your hometown is the site of the worst tornado in thirty years! With the damage to the TV studio, traditional news media have no way to provide information and show the extent of the tornado damages. Luckily, the cellular telecommunications network is still up and running. As you walk around in the debris, your portable video switch receives broadcasts from people around the city listed in order by their distance from your present position. You select the ones of the video streams that have the most interesting content, and create a running commentary explaining the situation. You then receive offers from the TV networks for feed from your production. As you wander your portable video switch picks up different individual video stream broadcasts in your area and patches them into your video switch. You notice one very weak video signal coming in, which piques your curiosity. You use the portable video switch controls to turn up the gain on the signal (a command which propagates backwards across the network to the video source capture device) and observe that some people are trapped in a basement and calling anyone who will see their signal for help! You quickly cut to them, and forward that signal to emergency authorities. The authorities arrive on the scene in minutes, and you capture the rescue from both inside and outside the basement and broadcast the video.

EXAMPLE 3

You are a member of a labor group, which is staging a global protest at mines around the world demanding safer working conditions and higher pay. You use your wireless portable video switch to receive video streams from your colleagues who establish video connection with you by dialing the telephone number of your portable video switch in response to the request you sent out. You easily create a live presentation allowing the world to view the plight of the mineworkers including close-ups of the dangerous and unsafe conditions your labor group is protesting.

A portable device for switching video streams embodying the present invention has been described above in several preferred embodiments. It will be appreciated and understood that numerous modifications may be made by those skilled in the art of video stream transmission and production without departing from the spirit and scope of the invention as presented. Therefore, the present invention has been shown by way of illustration rather than limitation.

What is claimed is:

1. Apparatus for remote switching of video streams comprising:

at least two video capture devices, each of which defines a different source of real time image captured video streams; and portable video switch means located remotely from said different sources of real time image captured video streams and having input means for receiving substantially simultaneously one or more real time image captured video streams originating from said at least two different sources, and said portable video switch means further having means for responding to an input command for successively selecting in real time desired ones of said one or more real time image captured video streams from each of said at least two different sources of real time image captured video streams for producing a final product video stream comprising said selected desired ones of said one or more real time image captured video streams for further transmission for viewing as a final product video stream by a user.

2. Apparatus for remote switching of video streams as defined in claim 1, wherein said source of the remote real time image captured video stream further comprises a remote video capture device.

3. Apparatus for remote switching of video streams as defined in claim 2, wherein said remote video capture device comprises a videophone.

4. Apparatus for remote switching of video streams as defined in claim 1 further including:

a network, and network server means coupled to said network for receiving said one or more real time image captured video streams from said at least two different sources of real time image captured video streams, said at least two different sources of real time image captured video streams further being connected to the network, said network server means further being coupled to said portable video switch means for selecting said desired ones of said one or more real time image captured video streams in accordance with instructions received from said portable video switch for producing said final product video stream.

5. Apparatus for remote switching of video streams as defined in claim 1 further comprising said network server means having an output coupled to a further transmission means for transmitting said final product video stream for viewing at a location remote from said network server means and said portable video switch means.

6. Apparatus for remote switching of video streams as defined in claim 5, wherein said further transmission means comprises a global computer network.

7. Apparatus for remote switching of video streams as defined in claim 4 wherein said network server means further comprises a dedicated network server.

8. Apparatus for remote switching of video streams as defined in claim 1 further including a wireless local area network (LAN) coupled to said portable video switch means for transferring at least one video stream from at least one video source connected to the wireless LAN.

9. Apparatus for remote switching of video streams as defined in claim 8 further comprising:

wireless LAN access means for receiving said at least one video stream from said at least one video source, and network server means coupled to said wireless LAN access means and said portable video switch means for manipulating a selected video stream to add special effects in response to instructions received from said portable video switch means.

10. Apparatus for remote switching of video streams as defined in claim 1, wherein said portable video switch means further comprises a mobile terminal for receiving in real time a multiple number of different real time image captured video streams from a multiple number of different video sources by means of a mobile telecommunication network, each of said different video sources having mobile telecommunication capability to selectively connect to said portable video switch means by accessing the mobile terminal associated with said portable video switch means.

11. Apparatus for remote switching of video streams as defined in claim 1 further comprising said portable video switch having means for viewing at substantially the same time in real time the video content of said one or more real time image captured video streams.

12. Apparatus for remote switching of video streams as defined in claim 11 further comprising said portable video switch means having;

input means for selecting and controlling special effects, and processing means for manipulating a selected real time video stream viewed on said portable video switch to add said special effects in response to directions from said input means.

13. Apparatus for remote switching of video streams as defined in claim 11 further comprising said portable video switch means having video capture means co-located with said portable video switch means for providing a yet further different source of real time image captured video streams.

14. Apparatus for remote switching of video streams as defined in claim 10 further comprising each of said different sources of real time image captured video streams having mobile telecommunication capability to connect to any of a number of different portable video switch means via a mobile telecommunication network to transmit its respective remote real time image captured video streams to the said connected one of the number of different portable video switch means.

15. Apparatus for remote switching of video streams as defined in claim 14 wherein said mobile telecommunication network further comprises a cellular telephone network.

16. Method for remote switching of video streams comprising the steps of:

providing to a network server substantially simultaneously at least two real time image captured video streams each of which originate at a respective different video stream source;

providing a portable video switch for viewing substantially simultaneously or at the same time the video image content of the at least two real time image captured video streams provided to the network server;

successively selecting in real time via the portable video switch desired ones of said at least two real time image captured video streams at the network server based on the video information content of the real time image captured video streams;

producing a final product video stream comprising said selected desired ones of said at least two real time image captured video streams, and transmitting the final product video stream for viewing at a location remote from the network server.

17. The method for remote switching of video streams as defined in claim 16 further including the step of providing instructions to the network server via the portable video switch to modify the selected real time image captured video stream with one or more desired video effects during the step of producing the final product video stream for further transmission.

18. The method for remote switching of video streams as defined in claim 17 further including the step of providing a dedicated network server.

19. The method for remote switching of video streams as defined in claim 17 further including the step of providing a wireless LAN network.

20. The method for remote switching of video streams as defined in claim 16 further including the step of providing a portable video switch with mobile telecommunication capability.

21. The method for remote switching of video streams as defined in claim 16 wherein the step of providing substantially simultaneously at least two real time image captured video streams further includes providing real time image captured video streams from a video capture device.

22. The method for remote switching of video streams as defined in claim 21 further including the step of providing real time image captured video streams from a video telephone.

23. The method for remote switching of video streams as defined in claim 20 further including the step of providing a portable video switch with video processor capability wherein the portable video switch also functions as the network server.

24. The method for remote switching of video streams as defined in claim 16 wherein the step of transmitting said successively selected real time image captured video streams comprising said final product video stream includes the step of transmitting to the global computer network.

25. The method for remote switching of video streams as defined in claim 20 wherein the step of transmitting said successively selected real time image captured video streams comprising said final product video stream includes the step of transmitting to a remote video telephone that has established a communication link with the portable video switch.

26. The method for remote switching of video streams as defined in claim 16 further including the step of providing a portable video switch with video signal enhancing capability.

27. A system for remote switching of video streams comprising:
  a network;
  at least two video capture devices, each of which defines a different source of real time image captured video streams coupled to said network;
  a network server for receiving substantially simultaneously in real time said real time image captured video streams from said at least two different sources of real time image captured video streams connected to said network;
  a portable video switch located remotely from said different sources of real time image captured video streams and coupled to said network server, said portable video switch further including:
  means for receiving and viewing substantially simultaneously video images corresponding to said real time image captured video streams from said at least two different sources of real time image captured video streams;
  means for successively selecting in real time at said network server desired ones of said real time image captured video streams based on said video images of said real time image captured video streams viewed at said portable video switch;
  means for producing a final product real time video stream comprising said desired ones of said one or more real time image captured video streams for further transmission by said network server, and
  said network server further having output means coupled to a further transmission means for transmitting said successively selected real time image captured video streams comprising said final product video stream for viewing at a location remote from said network server.

28. A system for remote switching of video streams as defined in claim 27 wherein said at least two different source of real time image captured video streams further comprises a remote video capture device.

29. A system for remote switching of video streams as defined in claim 28 wherein said remote video capture device further comprises a videophone.

30. Apparatus for remote switching of video streams, comprising:
  a network server for receiving substantially simultaneously in real time at least two different real time image captured video streams from at least two respective different video capture devices, each of which defines a source of real time image captured video streams;
  a portable video switch located remotely from said network server for viewing substantially simultaneously in real time the video images of said at least two different real time image captured video streams received at the network server;
  said portable video switch further comprising:
  means for successively selecting in real time at the network server desired ones of said at least two different real time image captured video streams based on the video images corresponding to said real time image captured video streams; and
  means for producing a final product video stream comprising said selected desired ones of said at least two real time image captured video streams for further transmission by said network server, and
  said network server further comprising means for transmitting said successively selected desired ones of said at least two different real time image captured video streams comprising said final product video stream for viewing at a location remote from said network server.

* * * * *

UNITED STATES PATENT AND TRADEMARK OFFICE
CERTIFICATE OF CORRECTION

PATENT NO. : 6,839,080 B2
DATED : February 8, 2005
INVENTOR(S) : Stephan Meyers

It is certified that error appears in the above-identified patent and that said Letters Patent is hereby corrected as shown below:

Title page,
Item [75], Inventors, after "Meyers," "Tampere (Fl)" should be -- Los Angeles, CA --.

Column 12,
Line 25, after "wherein" -- at least one of -- should be inserted.

Signed and Sealed this

Fifth Day of July, 2005

JON W. DUDAS
*Director of the United States Patent and Trademark Office*